Oct. 5, 1954 F. A. MORRIS 2,691,070
PARTY LINE STATION IDENTIFICATION DIAL MECHANISM
Filed Nov. 19, 1953
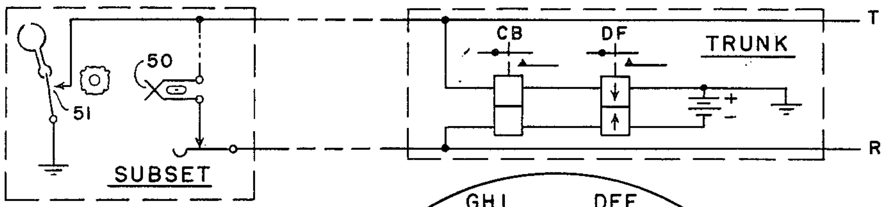
FIG. 8
FIG. 7
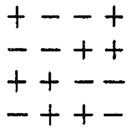
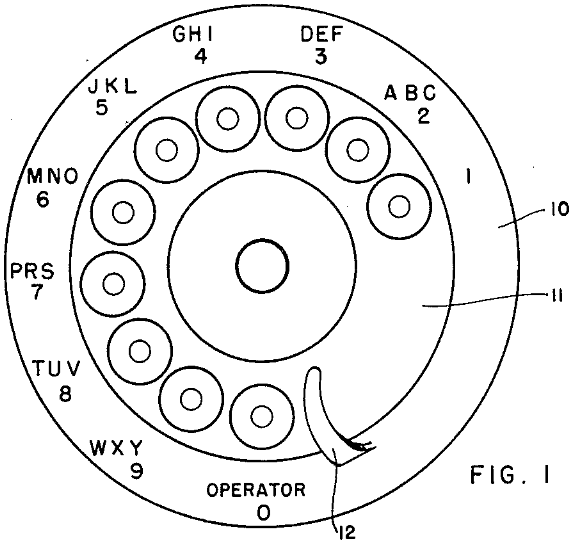
FIG. 1
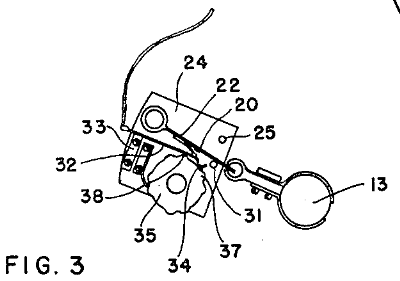
FIG. 3
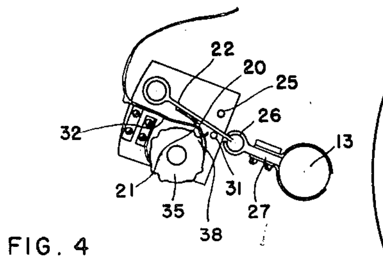
FIG. 4
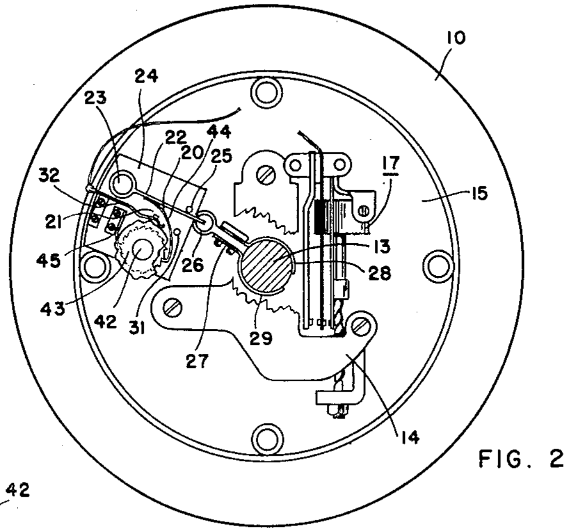
FIG. 2
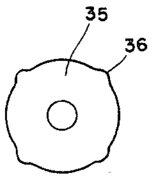
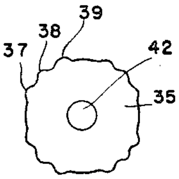
FIG. 5 FIG. 6
*INVENTOR.*
FRANK A. MORRIS
*BY* Leamis E Blake
ATTORNEY Patented Oct. 5, 1954 2,691,070

UNITED STATES PATENT OFFICE 2,691,070

PARTY LINE STATION IDENTIFICATION DIAL MECHANISM

Frank A. Morris, Rochester, N. Y., assignor to Stromberg-Carlson Company, a corporation of New York Application November 19, 1953, Serial No. 393,107

11 Claims. (Cl. 179—90)

The present invention relates to automatic telephone systems and more particularly to a party line station identification dial mechanism.

Automatic telephone systems throughout the country are developing to the point where it is now possible for the customer to dial long distance toll calls between cities. Also, the growth of cities and their outlying suburbs to form large metropolitan areas served by a particular automatic telephone system is making it desirable to provide for the charging of toll rates depending upon the distance and length of time over which a call may be extended between various exchanges in the metropolitan system. Therefore, automatic toll ticketing arrangements have been developed for determining the charges to be made for different calls extended by customer dialing procedures.

When using automatic toll ticketing apparatus, the station extending the call must of course be identified to the automatic ticketing equipment. This is a relatively simple matter in the case of private lines, but in the case of party lines, some means to identify the particular call extending station on the party line must be provided.

There may be other applications in an automatic telephone system wherein it is desirable to automatically identify a particular party line station seeking to extend a call.

It is a principal object of the present invention to provide an improved impulse transmitting dial mechanism for use at a party line station and arrranged to automatically identify the particular party line station by its operation in extending a call therefrom.

Another object of the invention is to provide an improved form of station identification dial mechanism that may be easily incorporated in conventional automatic telephone systems without requiring excessive amounts of additional circuits and without requiring sensitive or high speed operation of the identification circuits.

To accomplish the foregoing objects, the invention features an impulse transmitting dial mechanism having characteristic station identification impulse producing means in the form of a set of station identifying contacts to be operated only during the movement of the dial away from its normal position and before the operation of the conventional call extending digital impulse producing contacts which are thereafter operated during movement of the dial in returning to its normal position. Since automatic telephone systems require the transmission of successive sets of call extending impulses corresponding to a plurality of successive digits, the invention further provides that the calling station identification be indicated by the characteristic operations of the station identification contacts responsive only to a determined plurality of movements of the dial from its normal position as required to transmit a determined plurality of sets of digital impulses. Thus, for example, in one application of the invention, the station identifying contacts may be arranged to be closed a characteristic number of times in four successive operations of the dial mechanism as required to transmit the impulses of four digits. With a four party line, for example, each dial mechanism at the respective party station is arranged to close the station identifying contacts a characteristic total number of times in four successive operations of the dial such as once for station one, twice for station two, and so forth. The closure of the station identification contacts may be indicated over the line to the exchange in any suitable manner such as, for example, by grounding one side of the line upon closure of the contacts. Suitable relays are then provided in the exchange circuits not forming a part of this invention to respond to the unbalanced line conditions thus produced and thereby identify the calling party station.

Further objects, features, and the attending advantages of the invention will be apparent with reference to the following specification and drawing in which Fig. 1 is a front face view of the dial mechanism of the invention, Fig. 2 is a rear view of the dial mechanism showing in detail the station identification impulse producing mechanism and showing fragmentary portions of the conventional switch directing digital impulse producing mechanism, Fig. 3 is a fragmentary detail of the station identification impulse producing mechanism only with the parts in an operated position at a time when no station identification impulse is produced, Fig. 4 is a view similar to Fig. 3 but showing the parts in the operated position when a station identification impulse is produced, Fig. 5 is a detailed view of a station identification cam for a particular station such as station one in a four party system, Fig. 6 is a view similar to Fig. 5 but showing the particular station identification cam for a different particular station such as station three in a four party system, Fig. 7 graphically illustrates the occurrence of the two station identification pulses during the transmission of four station directing sets of digital impulses to thereby identify station two in a four party system, and further illustrates how the two station identification pulses may occasionally vary in their patterns of occurrence for separate instances of dial use, and Fig. 8 is a simplified schematic diagram of an exchange circuit having a differential relay arranged to respond to the closure of the station identification impulse producing contacts.

Referring to Figs. 1 and 2 of the drawing, the dial mechanism may comprise the backing plate 10 and the rotatable dial 11 movable in a first direction clockwise away from the starting point or normal position to the left of the finger stop 12. The rotatable dial 11 is secured to the rotatably mounted dial shaft 13 journaled on the bracket 14 that is fastened to the main dial frame plate 15. The dial mechanism thus far described may be entirely conventional and is arranged to operate the conventional switch directing digital impulse producing mechanism generally shown at 17, the details of which are omitted since they form no part of the present invention. Such mechanism customarily operates to close the switch directing digital impulse producing contacts during the return movement of the dial 11 in the counterclockwise direction, as shown by Fig. 1, back from the operated or other position to the normal position.

Referring now in more detail to Figs. 2–6 of the drawings, a pair of station identifying impulse producing contacts 20 and 21 are arranged in the dial mechanism to be described to be closed a characteristic number of times during successive operations of the dial in the first direction as required to successively set the dial for transmission of a predetermined number of successive sets of switch directing digital impulses. Contact 20 is mounted on the contact arm 22 which is pivoted at 23 to the sub-frame plate 24. The contact arm 22 normally rests in the position shown in Fig. 2 of the drawing in a manner to engage the stop pin 25. The free end of the contact arm 22 is pivotally connected by means of the slip joint 26 to an operating arm 27 that is frictionally clutched by the spring clutch fingers 28 and 29 to the rotatable dial shaft 13. This arrangement is such that as the dial shaft 13 rotates in the clockwise direction as seen in Fig. 2, the contact arm 22 is moved to the position shown against the stop pin 25. Continued rotation of the dial shaft 13 in the clockwise direction of Fig. 2 will be permitted due to the slipping of the frictional connection between the dial shaft 13 and the clutch fingers 28 and 29.

When the dial shaft 13 is moved in the counterclockwise direction of Figs. 2, 3 or 4, the operating arm 27 will be moved to correspondingly move the contact arm 22 to the position shown in Figs. 3 and 4 with its outer end engaging the stop pin 31. Continued rotation of the dial shaft 13 in the counterclockwise direction of Figs. 2–4 is permitted by the aforesaid functioning of the spring clutch fingers 28 and 29. It will be remembered that the views of Figs. 2–4 are the reverse of Fig. 1 and that, therefore, a movement of the dial plate 11 in the first or clockwise direction of Fig. 1 corresponds to a counterclockwise movement of the dial shaft 13 as seen in Figs. 2–4 of the drawing so that while the dial plate 11 is rotated clockwise off-normal to set the dial for transmission of digit impulses, the contact arm 22 will be actually moved to the position shown in Figs. 3 and 4.

The second station identification contact 21 is mounted upon the spring finger arm 32 secured at 33 to the sub-frame 24. The pivoted position of the spring arm 32 is determined by the engagement of its free end 34 with the periphery of the station identification cam 35. As shown in more detail in Figs. 5 and 6, each characteristic station identification cam may have a predetermined number of cam lobes such as 36 for station one in a four party system, or 37–39 for station three in a four party system. Obviously, the number of cam lobes 36–39 will be determined by the particular identification desired for a designated station of a party line. In the present description of the invention, its application to a four station party line only will be described although it will be understood that various modifications may be made to adapt the principles of the invention to party line systems having other numbers of party line stations connected to a given party line. For example, a fifth station on the party line might be identified by a dial mechanism having a station identifying cam without cam lobes on its periphery so that no identifying contact closures would be produced.

As shown in Fig. 3, when the free end of the spring contact arm 32 is resting on the periphery of the cam intermediate to the cam lobes 37 and 38, the station identification contacts 20 and 21 will not close during the setting movement of the dial. However, when the free end of the spring contact arm 32 is resting on a cam lobe such as shown at 38 in Fig. 4, the station identification contacts 20 and 21 will close to transmit a characteristic station identifying impulse during that particular setting movement of the dial in a manner to be later described in more detail.

The station identification cam 35 is rotatably mounted on a shaft 42 secured to the sub-frame 24. A ratchet 43 is secured to the underside of the station identification cam 35 as shown by the dotted lines of Fig. 2 of the drawing. A pawl arm 44 is secured to the contact arm 22 for movement therewith in a manner to rotate the station identification cam 35 a predetermined distance equivalent to the arc of one ratchet tooth for each movement of the contact arm 22 from the stop 31 toward the stop 25 as obtained when the dial is rotating in the second direction to return to the normal position during transmission of switch directing digital impulses. A ratchet locking arm 45 retains the station identification cam in its last advanced position by preventing reverse rotation of the ratchet 43.

Considering, for example, the application of the invention to a four station party line system in which it is required to transmit at least four successive sets of switch directing digital impulses, the station identification cam 35 and ratchet 43 may be proportioned to rotate the identification cam 35 through an arc of 90° during a total of four successive movements of the dial for transmitting four successive sets of digital impulses. Stated another way, each movement of the dial in the first dial setting direction will move the identification contact arm 22 to the advanced position engaging the stop pin 31 while each return of the dial mechanism to the normal position during transmission of digital impulses will return the identification contact arm 22 to the normal position engaging the stop pin 25 and will at that time actuate the ratchet and pawl mechanism to move the station identification cam 35 through an arc of travel equivalent to one-quarter of the total 90° travel required to be provided for four successive operations of the dial mechanism. The station identification cam lobes such as variously shown at 36—39 will be positioned equidistantly within the peripheral arc corresponding to 90° of the cam periphery. Thus when using an identification cam for station two of a four party system such as shown in Figs. 3 and 4 of the drawing, four successive operations of the dial mechanism for transmitting four sets of digital impulses will produce a total number of two closures of the station identification contacts 20 and 21 during the successive movements of the dial in the dial setting direction only.

It will be remembered that various automatic telephone systems employ different total numbers of sets of digital impulses for establishing a connection. Perhaps the most common system employs a total of seven digits for extending a connection and therefore the characteristic number of station identification contact closures during transmission of the four successive digit impulses may occur either early or later in the transmission of the connection extending digital impulses depending upon the requirements of a particular telephone system. For example, when applying the invention to a telephone system employing a total of seven digits for extending a connection, it may be desirable to provide suitable counting circuits in the trunk circuit not forming part of the present invention, for the purpose of counting the four successive digits during the transmission of which the station identification pulses are sent. After the four successive digits have been transmitted, the counting circuit may then automatically operate to electrically prevent the recognition of any further station identification impulses that may be produced by the operation of the dial mechanism station identification cam 35. An alternative arrangement which may be used with a seven digit system would be to provide seven possible identification cam lobes thus enabling the identification of a maximum of eight parties in a similar manner to the identification of a maximum of five parties when using the four lobe identification cam 35 as previously described. Other alternative arrangements, depending upon the numbering scheme of the telephone system, should be readily apparent.

As shown in Fig. 7 of the drawing, the identification of station two in a four party system might be variously indicated by the total number of closures of the station identification contacts during the transmission of four successive digits. In the graphic illustration of Fig. 7 the closure of the station identification contacts is represented by a cross while the non-closure of the contacts is indicated by a dash, and it will be seen that while the pattern of the closures of the station identification contacts may be different at different times of operation, nevertheless the total number of closures of the station identification contacts during transmission of four successive sets of digital impulses remains the same, namely, two for station two of a four party system.

A simplified form of exchange circuit arranged to respond to the closures of the station identification impulse producing contacts is shown in Fig. 8 of the drawing. The conventional switch directing impulse contacts are schematically shown at 50 for closing a loop across the tip and ring conductors while the station identifying impulse producing contacts are schematically shown at 51 to function when closed to connect ground (positive station battery) to the tip side of the line which thereby causes operation of the differential relay DF in series with the calling bridge relay CB. When the station identification impulse producing contacts, diagrammatically shown at Fig. 1, are not closed, the differential relay DF does not operate as should be readily understood. Any suitable circuit arrangements arranged to count the total number of operations of the differential relay DF during the transmission of four successive sets of digital impulses may be employed to thereby identify the particular party line station as indicated by the characteristic station identification impulse producing mechanism at that station. Since the arrangement of relay counting chains for purposes of counting successive operations of a relay are well known, it is not believed necessary to describe such circuits in detail as they form no part of the present invention.

In the foregoing I have described a novel form of station dial mechanism in which station identification impulse producing contacts are operated during the setting movement of the dial in the first direction from the normal position to the other or set position before the transmission of the switch directing digital impulses. It should also be noted that station identification dial mechanism of the invention operates to identify the particular party line station by providing a characteristic operation of station identification contacts during a plurality of successive operations of the dial mechanism. In this arrangement the identification of the particular calling station is not completed until the dial mechanism has been operated a predetermined number of plurality of times for transmitting a predetermined plural number of sets of digital impulses. While the invention has been particularly described in connection with a four station party line system it should be understood that the principles of the invention may be readily adapted to other systems having other numbers of stations or party lines or employing other than the described four successive operations of the dial mechanism. When other numbers of successive operations of the dial mechanism are employed, it will be apparent that the arrangement of the station identification lobes on the identification cam 35 will be suitably rearranged together with a suitable proportioning of the design and numbers of the ratchet teeth, to thereby predetermine the total number of closures of the station identification contacts for any given number of successive operations of the dial mechanism. It may also be possible to identify a particular party line station by the pattern of occurrences of the closures of the station identification contacts and such an application of the invention is contemplated in the present description, it being understood that suitable circuits for sensing the pattern of occurrences will be used.

Various modifications may be made within the spirit of the invention and the scope of the appended claims.

What is claimed is:

1. In a calling device, a dial having a normal position and rotatable in one direction from the normal position to another position and rotatable in a second direction from the other position to return to the normal position, a first set of impulsing contacts, means responsive to the movement of the dial in the second direction from the other position to the normal position to operate said first set of impulsing contacts a variable number of times in accordance with the degree of rotation of said dial, a second set of impulsing contacts, and means to operate said second set of impulsing contacts during predetermined ones only of a determined plurality of movements of said dial in the one direction, the operations of said second set of impulsing contacts responsive to said determined plurality of movements of said dial in the one direction being characteristic of a particular dial and associated calling device.

2. In a calling device, a dial having a normal position and rotatable in one direction from the normal position to another position and rotatable in a second direction from the other position to return to the normal position, a first set of impulsing contacts, means responsive to the movement of the dial in the second direction from the other position to the normal position to operate said first set of impulsing contacts a variable number of times in accordance with the degree of rotation of said dial, a second set of impulsing contacts, and means to operate said second set of impulsing contacts during predetermined ones only of a determined plurality of movements of said dial in the one direction, the total number of times said second set of impulsing contacts is operated responsive to said determined plurality of movements of said dial in the one direction being characteristic of a particular dial and associated calling device.

3. In a calling device, a dial having a normal position and rotatable in one direction from the normal position to another position and rotatable in a second direction from the other position to return to the normal position, a first set of impulsing contacts, means responsive to the movement of the dial in the second direction from the other position to the normal position to operate said first set of impulsing contacts a variable number of times in accordance with the degree of rotation of said dial, a second set of impulsing contacts, and means to operate said second set of impulsing contacts once only during predetermined ones of a determined plurality of movements of said dial in the one direction, the operations of said second set of impulsing contacts responsive to said determined plurality of movements of said dial in the one direction being characteristic of a particular dial and associated calling device.

4. In a calling device, a dial having a normal position and rotatable in one direction from the normal position to another position and rotatable in a second direction from the other position to return to the normal position, a first set of impulsing contacts, means responsive to the movement of the dial in the second direction from the other position to the normal position to operate said first set of impulsing contacts a variable number of times in accordance with the degree of rotation of said dial, a second set of impulsing contacts, and means to operate said second set of impulsing contacts once only during predetermined ones of a determined plurality of movements of said dial in the one direction, the total number of times said second set of impulsing contacts is operated responsive to said determined plurality of movements of said dial in the one direction being characteristic of a particular dial and associated calling device.

5. In a calling device, the party line station identification dial mechanism including in combination, a frame, a dial shaft rotatably supported on said frame, a dial plate secured to said shaft for rotation therewith, means to rotate said dial a variable angular amount in one direction from a normal position to another position, means to rotate said dial in a second direction to return it from the other position to the normal position, a first set of impulsing contacts, means to operate said first set of contacts a variable number of times responsive to the degree of rotation of said dial in the second direction for producing a series of impulses corresponding to a dialed digit, a pair of station identification impulse producing contacts, a first contact arm movably mounted on said frame, a second contact arm movably mounted on said frame, a respective one of said identification contacts being mounted on a respective one of said first and second contact arms to be moved with said arms into and out of engagement with each other, means associated with said first contact arm and said dial shaft to move said first contact arm towards said second contact arm to an advanced position as said dial and shaft are rotated in the first direction from the normal position, a cam plate rotatably supported on said frame and having a cam surface engaging the movable end of said second contact arm, means to rotate said cam plate a predetermined amount in response to each successive movement in the second direction by said dial shaft, said cam plate having a characteristic number of station identifying cam portions in a given length of cam surface corresponding to a predetermined amount of cam rotation as obtained by a predetermined number of successive rotations of said shaft in the second direction, said second contact arm when engaging the cam portions of said cam surface being moved towards said first contact arm to an advanced position, the relative positions of said contact arms being such as to close contact between said identification contacts only when said contact arms are both in the advanced positions toward each other whereby a characteristic number of closures of said identification contacts will be made responsive to a predetermined number of successive movements of said dial plate in the first direction to thereby identify the party line station.

6. In a calling device, the party line station identification dial mechanism including in combination, a frame, a dial shaft rotatably supported on said frame, a dial plate secured to said shaft for rotation therewith, means to rotate said dial a variable angular amount in one direction from a normal position to another position, means to rotate said dial in a second direction to return it from the other position to the normal position, a first set of impulsing contacts, means to operate said first set of contacts a variable number of times responsive to the degree of rotation of said dial in the second direction for producing a series of impulses corresponding to a dialed digit, a pair of station identification impulse producing contacts, a first contact arm movably mounted on said frame, a second contact arm movably mounted on said frame, a respective one of said identification contacts being mounted on a respective one of said first and second contact arms to be moved with said arms into and out of engagement with each other, an operating arm having one end frictionally secured to said shaft for limited movement in either direction therewith, the free end of said operating arm engaging said first contact arm to move said first contact arm towards said second contact arm to an advanced position as said dial and shaft are rotated in the first direction from the normal position, a cam plate rotatably supported on said frame and having a cam surface engaging the movable end of said second contact arm, means to rotate said cam plate a predetermined amount in response to each successive movement in the second direction by said dial shaft, said cam plate having a characteristic number of station identifying cam portions in a given length of cam surface corresponding to a predetermined amount of cam rotation as obtained by a predetermined number of successive rotations of said shaft in the second direction, said second contact arm when engaging the cam portions of said cam surface being moved towards said first contact arm to an advanced position, the relative positions of said contact arms being such as to close contact between said identification contacts only when said contact arms are both in the advanced positions toward each other whereby a characteristic number of closures of said identification contacts will be made responsive to a predetermined number of successive movements of said dial plate in the first direction to thereby identify the party line station.

7. In a calling device, the party line station identification dial mechanism including in combination, a frame, a dial shaft rotatably supported on said frame, a dial plate secured to said shaft for rotation therewith, means to rotate said dial a variable angular amount in one direction from a normal position to another position, means to rotate said dial in a second direction to return it from the other position to the normal position, a first set of impulsing contacts, means to operate said first set of contacts a variable number of times responsive to the degree of rotation of said dial in the second direction for producing a series of impulses corresponding to a dialed digit, a pair of station identification impulse producing contacts, a first contact arm movably mounted on said frame, a second contact arm movably mounted on said frame, a respective one of said identification contacts being mounted on a respective one of said first and second contact arms to be moved with said arms into and out of engagement with each other, means associated with said first contact arm and said dial shaft to move said first contact arm towards said second contact arm to an advanced position as said dial and shaft are rotated in the first direction from the normal position, a circular cam plate rotatably supported on said frame and having a peripheral cam surface engaging the movable end of said second contact arm, means to rotate said cam plate a predetermined amount in response to each successive movement in the second direction by said dial shaft, said cam plate having a characteristic number of station identifying raised cam portions along a given length of its peripheral cam surface corresponding to a predetermined amount of cam rotation as obtained by a predetermined number of successive rotations of said shaft in the second direction, said second contact arm when engaging the raised cam portions of said cam surface being moved towards said first contact arm to an advanced position, the relative positions of said contact arms being such as to close contact between said identification contacts only when said contact arms are both in the advanced positions toward each other whereby a characteristic number of closures of said identification contacts will be made responsive to a predetermined number of successive movements of said dial plate in the first direction to thereby identify the party line station.

8. In a calling device, the party line station identification dial mechanism including in combination, a frame, a dial shaft rotatably supported on said frame, a dial plate secured to said shaft for rotation therewith, means to rotate said dial a variable angular amount in one direction from a normal position to another position, means to rotate said dial in a second direction to return it from the other position to the normal position, a first set of impulsing contacts, means to operate said first set of contacts a variable number of times responsive to the degree of rotation of said dial in the second direction for producing a series of impulses corresponding to a dialed digit, a pair of station identification impulse producing contacts, a first contact arm movably mounted on said frame, a second contact arm movably mounted on said frame, a respective one of said identification contacts being mounted on a respective one of said first and second contact arms to be moved with said arms into and out of engagement with each other, an operating arm having one end frictionally secured to said shaft for limited movement in either direction therewith, the free end of said operating arm engaging said first contact arm to move said first contact arm towards said second contact arm to an advanced position as said dial and shaft are rotated in the first direction from the normal position, a circular cam plate rotatably supported on said frame and having a peripheral cam surface engaging the movable end of said second contact arm, means to rotate said cam plate a predetermined amount in response to each successive movement in the second direction by said dial shaft, said cam plate having a characteristic number of station identifying raised cam portions along a given length of its peripheral cam surface corresponding to a predetermined amount of cam rotation as obtained by a predetermined number of successive rotations of said shaft in the second direction, said second contact arm when engaging the raised cam portions of said cam surface being moved towards said first contact arm to an advanced position, the relative positions of said contact arms being such as to close contact between said identification contacts only when said contact arms are both in the advanced positions toward each other whereby a characteristic number of closures of said identification contacts will be made responsive to a predetermined number of successive movements of said dial plate in the first direction to thereby identify the party line station.

9. In a calling device, the party line station identification dial mechanism including in combination, a frame, a dial shaft rotatably supported on said frame, a dial plate secured to said shaft for rotation therewith, means to rotate said dial a variable angular amount in one direction from a normal position to another position, means to rotate said dial in a second direction to return it from the other position to the normal position, a first set of impulsing contacts, means to operate said first set of contacts a variable number of times responsive to the degree of rotation of said dial in the second direction for producing a series of impulses corresponding to a dialed digit, a pair of station identification impulse producing contacts, a first contact arm movably mounted on said frame, a second contact arm movably mounted on said frame, a respective one of said identification contacts being mounted on a respective one of said first and second contact arms to be moved with said arms into and out of engagement with each other, an operating arm having one end frictionally secured to said shaft for limited movement in either direction therewith, the free end of said operating arm being pivotally secured to the free end of said first contact arm to move said first contact arm towards said second contact arm to an advanced position as said shaft is rotated in the first direction from the normal position and to move said first contact arm away from the advanced position as said shaft is rotated in the second direction, a cam plate rotatably supported on said frame and having a cam surface engaging the movable end of said second contact arm, a ratchet gear secured to said cam plate, a pawl carried by said first contact arm and engaging said ratchet gear to rotate said cam plate a predetermined amount in response to each successive movement in the second direction by said dial shaft causing a corresponding movement of said contact arm away from the advanced position, said cam plate having a characteristic number of station identifying cam portions in a given length of cam surface corresponding to a predetermined amount of cam rotation as obtained by a predetermined number of successive rotations of said shaft in the second direction, said second contact arm when engaging the cam portions of said cam surface being moved towards said first contact arm to an advanced position, the relative positions of said contact arms being such as to close contact between said identification contacts only when said contact arms are both in the advanced positions toward each other whereby a characteristic number of closures of said identification contacts will be made responsive to a predetermined number of successive rotations of said dial plate in the first direction to thereby identify the party line station.

10. In a calling device, the party line station identification dial mechanism including in combination, a frame, a dial shaft rotatably supported on said frame, a dial plate secured to said shaft for rotation therewith, means to rotate said dial a variable angular amount in one direction from a normal position to another position, means to rotate said dial in a second direction to return it from the other position to the normal position, a first set of impulsing contacts, means to operate said first set of contacts a variable number of times responsive to the degree of rotation of said dial in the second direction for producing a series of impulses corresponding to a dialed digit, a pair of station identification impulse producing contacts, a first contact arm movably mounted on said frame, a second contact arm movably mounted on said frame, a respective one of said identification contacts being mounted on a respective one of said first and second contact arms to be moved with said arms into and out of engagement with each other, an operating arm having one end frictionally secured to said shaft for limited movement in either direction therewith, the free end of said operating arm being pivotally secured to the free end of said first contact arm to move said first contact arm towards said second contact arm to an advanced position as said shaft is rotated in the first direction from the normal position, and to move said first contact arm away from the advanced position as said shaft is rotated in the second direction, a circular cam plate rotatably supported on said frame and having a peripheral cam surface engaging the movable end of said second contact arm, a ratchet gear secured to said cam plate, a pawl carried by said first contact arm and engaging said ratchet gear to rotate said cam plate a predetermined amount in response to each successive movement in the second direction by said dial shaft causing a corresponding movement of said contact arm away from the advanced position, said cam plate having a characteristic number of station identifying raised cam portions along a given length of its peripheral cam surface corresponding to a predetermined amount of cam rotation as obtained by a predetermined number of successive rotations of said shaft in the second direction, said second contact arm when engaging the raised cam portions of said cam surface being moved towards said first contact arm to an advanced position, the relative positions of said contact arms being such as to close contact between said identification contacts only when said contact arms are both in the advanced positions toward each other whereby a characteristic number of closures of said identification contacts will be made responsive to a predetermined number of successive rotations of said dial plate in the first direction to thereby identify the partly line station.

11. In a calling device, a dial having a normal position and rotatable in one direction from the normal position to another position and rotatable in a second direction from the other position to return to the normal position, a first set of impulsing contacts, means responsive to the movement of the dial in the second direction from the other position to the normal position to operate said first set of impulsing contacts a variable number of times in accordance with the degree of rotation of said dial, a second set of impulsing contacts, and means to operate said second set of impulsing contacts during predetermined ones only of a determined plurality of movements of said dial, the total number of times said second set of impulsing contacts is operated responsive to said determined plurality of movements of said dial being characteristic of a particular dial and associated calling device.

No references cited.